United States Patent
Pedersen (10) Patent No.: US 8,194,902 B2
(45) Date of Patent: Jun. 5, 2012

(54) WIRELESS NETWORK PROTOCOL FOR A HEARING SYSTEM

(75) Inventor: Brian Dam Pedersen, Ringsted (DK)

(73) Assignee: GN ReSound A/S, Ballerup (DK)

( * ) Notice: Subject to any disclaimer, the term of this patent is extended or adjusted under 35 U.S.C. 154(b) by 665 days.

(21) Appl. No.: 12/353,174

(22) Filed: Jan. 13, 2009

(65) Prior Publication Data

US 2010/0158292 A1    Jun. 24, 2010

(30) Foreign Application Priority Data

Dec. 22, 2008   (DK) .................................. 2008 01829

(51) Int. Cl.
*H04R 25/00*   (2006.01)

(52) U.S. Cl. ..................... 381/315; 710/110; 455/422.1; 340/426.2

(58) Field of Classification Search ................... 381/215, 381/315; 710/110; 340/426.2; 455/422.1
See application file for complete search history.

(56) References Cited

U.S. PATENT DOCUMENTS

| | | |
|---|---|---|
| 2003/0154336 A1 | 8/2003 | Ballantyne et al. |
| 2004/0152478 A1 | 8/2004 | Ruohonen et al. |
| 2005/0089183 A1 | 4/2005 | Niederdrank et al. |
| 2007/0271137 A1 | 11/2007 | Vezza et al. |

FOREIGN PATENT DOCUMENTS

| | | |
|---|---|---|
| GB | 2328583 A | 2/1999 |
| WO | 2004 110099 A2 | 12/2004 |
| WO | 2007 104308 A1 | 9/2007 |
| WO | 2007104308 A1 | 9/2007 |

OTHER PUBLICATIONS

Search Report for Application No. PA 2008 01829.
International-Type Search Report for Danish Application No. 2008/1829.

*Primary Examiner* — Jerome Jackson, Jr.
*Assistant Examiner* — Dale E Page
(74) *Attorney, Agent, or Firm* — Vista IP Law Group, LLP (57) ABSTRACT

A hearing system includes a first hearing instrument having a first receiver for wireless data communication with a device in a wireless network, and a first communication controller that is configured for controlling the wireless data communication in accordance with a protocol of the wireless network according to which, a transmitter of the device is controlled to transmit wireless data in a specific time slot in a frame of time slots, and the first receiver of the first hearing instrument is repeatedly enabled to receive data for an activated time period and disabled from receiving data for a de-activated time period, wherein the first communication controller is further configured for synchronizing the first hearing instrument to the device in the wireless network by adjusting a sum of the activated time period and the de-activated time period to be different from a duration of the frame so that the specific time slot for the transmission of data by the transmitter and the activated time period will overlap at one time.

22 Claims, 4 Drawing Sheets

WIRELESS NETWORK PROTOCOL FOR A HEARING SYSTEM

RELATED APPLICATION DATA

This application claims priority to and the benefit of Danish patent application No. PA 2008 01829, filed on Dec. 22, 2008, the entire disclosure of which is expressly incorporated by reference herein.

FIELD

The present application relates to a hearing system comprising a hearing instrument having a receiver and a transmitter for wireless data communication between the hearing instrument and another device in a wireless network, and a communication controller that is adapted for controlling the wireless data communication in accordance with a protocol of the wireless network. In particular, the present application relates to a method of synchronizing the hearing instrument with other devices in the wireless network.

BACKGROUND

WO 2004/110099 discloses a hearing aid wireless network with a communication protocol that is simple thereby requiring a small amount of code and power consumption during operation. Further, the acquisition time is low, and the latency is low.

The disclosed hearing aid comprises a transceiver for interconnection of the hearing aid with a wireless network for communication with a plurality of other devices, and a communication controller that is adapted for controlling data exchange through the network in accordance with the communication protocol.

In one of the disclosed embodiments, the transceiver and communication controller operate according to a time division multiplex access scheme (TDMA) wherein the time is divided into numbered time slots and different devices in the network communicate, e.g. receive data, in specific respective time slots.

WO 2007/104308 discloses a hearing aid with a communication circuit for wireless reception of signals wherein the hearing aid starts reception of data from the network with a required margin before its time slot, and then it determines the delay until data is actually received i.e. the start of the received data frame is detected, and the delay is recorded. At the next occurrence of the time slot, start of reception is adjusted, i.e. advanced or delayed, in accordance with the value determined during reception in the previous time slot.

Typically, in a hearing instrument, such as a hearing aid, only a limited amount of power is available from the power supply. For example, in a hearing aid, power is typically supplied from a conventional $ZnO_2$ battery.

However, wireless communication circuitry requires significant amounts of power, both during reception and transmission of data.

The present wireless network protocol makes incorporation of such wireless communication circuitry into a hearing instrument with limited power supply capabilities possible.

SUMMARY

According to a first aspect, a hearing system is provided, comprising a first hearing instrument having a first receiver for wireless data communication between the first hearing instrument and another device in a wireless network. The first hearing instrument may further have a first communication controller that is adapted for controlling the wireless data communication in accordance with a protocol of the wireless network. In accordance with the wireless network protocol, a second transmitter of the other device is controlled to transmit wireless data in a specific time slot in a frame of time slots, and the first receiver of the first hearing instrument is repeatedly enabled to receive data for an activated time period and disabled from receiving data for a de-activated time period. Advantageously, the first communication controller is further adapted for synchronising the first hearing instrument to another device in the network by adjusting the sum of the activated time period and de-activated time period to be different from, e.g. longer than, the duration of a frame so that the time slot for transmission of data and the activated time period will overlap at one time.

The first communication controller may further be adapted for adjusting the sum of the activated and de-activated time period to be equal to the duration of a frame upon reception by the first hearing instrument of data from the other device.

According to a second aspect, a method is provided of communication between devices in a wireless network, comprising the steps of
wireless transmission of data from a first device connected in the wireless network in a selected time slot in a frame of time slots,
enabling data reception for an activated time period and disabling data reception for a de-activated time period in a second device, and
synchronising the second device to the first device in the wireless network by adjusting the sum of the activated time period and de-activated time period to be different from, e.g. longer than, the duration of a frame so that the time slot for transmission of data and the activated time period will overlap at one time.

The present hearing system and method facilitate interconnection of a plurality of devices in the network, such as hearing instruments, remote controllers, fitting instruments, mobile phones, media players, headsets, door bells, alarm systems, broadcast systems, such as for tele coil replacement, etc, etc.

The hearing instrument may be a hearing aid, a tinnitus relieving device, a tinnitus therapy device, a noise suppression device, etc., or any combination of two or more of such devices.

The receiver and transmitter of the hearing instrument may be comprised in a radio chip, such as the Nordic Semiconductor radio chip "nRF24l01". However, a radio chip of this type draws significant amounts of current both when it transmits and receives. A conventional $ZnO_2$ battery is only capable of supplying the required amount of current for a limited time period, typically 1 millisecond. Continued supply of the required amount of current leads to a lowered supply voltage below which digital signal processing circuitry will stop operating properly. Further, the $ZnO_2$ battery will require time to recover after having supplied current to the radio chip during communication. Typically, the radio chip duty cycle, i.e. the percentage of radio turn-on time with respect to the sum of the radio turn-on and radio turn-off time, must be kept below 10%.

According to the present network protocol, devices in the network are synchronized so that every device in the network knows when to transmit and when to receive. Further, reception and transmission are performed in short bursts.

Thus, according to the present wireless network protocol, a hearing instrument, such as a hearing aid, is capable of data communication with low power consumption adequately supplied by, e.g., conventional $ZnO_2$ batteries.

In one embodiment, the receiver and communication controller operate according to a frequency diversification or spread spectrum scheme, i.e. the frequency range utilized by the wireless network is divided into a number of frequency channels, and data communication switch channels according to a predetermined scheme so that transmissions are distributed over the frequency range.

Preferably, a frequency hopping algorithm is provided that allows devices in the network to calculate what frequency channel the network will use at any given point in time without relying on the history of the network. For example, based on the present frequency channel number, a pseudo-random number generator calculates the next frequency channel number. This facilitates synchronization of a new device in the network, e.g. the new device comprises the same pseudo-random number generator as the devices already connected in the network. Thus, upon receipt of the current frequency channel number during acquisition, the new device will calculate the same next frequency channel number as the other devices in the network.

In a network operating according to a spread spectrum scheme, the communication has a low sensitivity to noise, since noise is typically present in specific frequency channels, and communication will only be performed in a specific frequency channel for a short time period after which communication is switched to another frequency channel.

Further, several networks may co-exist in close proximity, for example two or more hearing instrument users may be present in the same room without network interference, since the probability of two networks simultaneously using a specific frequency channel will be very low. Likewise, the hearing instrument network may coexist with other wireless networks utilizing the same frequency band, such as Bluetooth networks or other wireless local area networks. Hearing instruments according to the embodiments described herein may advantageously be incorporated into a binaural hearing aid system, wherein two hearing aids are interconnected through the wireless network for digital exchange of data, such as audio signals, signal processing parameters, control data, such as identification of signal processing programs, etc, etc, and optionally interconnected with other devices, such as a remote control, etc.

The receivers and transmitters of devices in the network may operate in accordance with a time-division-multiple-access (TDMA) frame structure, wherein time is divided into frames comprising a set of numbered time slots. Different devices in the network communicate in specific respective time slots. Thus, when connected in the network, the frames of the devices are synchronised.

Acquisition is the process of synchronizing a device not already synchronized with another device in the network. In an established network, one master device regularly transmits synchronization data, e.g. comprised in a link management package, for synchronization of other devices, so-called slave devices, in the network with the master device.

The network may have more than one master device, e.g. two master devices in a dual master network, whereby one device operates as the master device in a certain time period and another device operates as the master device in another time period. Thus, a device may operate as a master in one time period and as a slave during another time period. For example, in a hearing system with two hearing instruments, such as a binaural hearing system, the two hearing instruments may alternatingly operate as the master device of the network. Preferably, the master device is a hearing instrument, since the hearing instrument user will always carry the hearing instrument when he or she uses the network.

Initial acquisition is performed when a new network is established, e.g. when two hearing instruments are powered on and perform acquisition in order to get synchronized to each other and thereby establish a network. Further devices may be connect to the established network performing acquisition in a way similar to the acquisition performed by the hearing instruments or according to a different acquisition scheme.

Preferably, a new device is automatically recognized by the network and interconnected with the network.

Synchronization may for example be performed upon turn-on of the hearing instrument, upon manual activation of synchronization, upon automatic periodic initiation of synchronization, etc.

Every device in the network has its own identification number, e.g. a 32-bit number. Globally unique identities are not required since the probability of two users having hearing instruments with identical identifications is negligible.

The hearing system may operate in the 2.4 GHz industrial scientific medical (ISM) band. The ISM band may for example be divided into 80 frequency channels of 1 MHz bandwidth. A frequency hopping TDM scheme is preferred. During acquisition, the frequency hopping scheme may comprise a reduced number of frequency channels, e.g. less than 16 channels, preferably 4-8 channels, for faster acquisition. Channels of the reduced set of frequency channels are denoted acquisition channels. Preferably, the acquisition channels are distributed uniformly throughout the frequency band utilised by the network.

The duration of a time slot may for example be 1250 µs (twice the length of a minimum Bluetooth™ slot). The slots may be numbered from 0 to 255.

256 slots, i.e. slot 0 to slot 255, constitute a frame. Frames are also numbered.

Among factors influencing selection of the length of a slot, is the required lower latency of the system and a desired low overhead with respects to headers and PLL locking. Preferably, the slot length is a multiple of 625 µS, facilitating (i.e. not prevent) that the protocol according to the embodiments described herein can be implemented on BLUETOOTH™ enabled devices.

Each slot (except slot 128) is used for transmission by one specific device so that data collisions inside the network are prevented. Any slave device may transmit data in slot 128 and hence collisions may occur in this slot. The master device transmits timing information in slot 0. The slot and frame counters of a slave device are synchronized with the respective counters of the master device of the network.

A device may use one or more slots for transmission of data. Slots may be allocated during manufacture of a given device, or, slots may be allocated dynamically during acquisition. Preferably, the allocation table is stored in the master device.

Acquisition may for example be achieved when a device successfully receives a link management package in slot "0" and replies to it in slot "128".

In order to lower power consumption in the hearing instrument, the hearing instrument receiver and transmitter are activated, i.e. allowed to operate for reception and transmission, respectively, e. g. turned on, only in their respective time slots. Further, the bit rate can be made scalable in such a system: When low bit transfer rates are required, the transceiver need only be active a small fraction of the time. In this way power can be saved.

In order for a device to be operationally connected to the network, its timing must be synchronized to the other devices in the network so that activation and de-activation, e.g. turn-on and turn-off, timing of receivers and transmitters of the devices are appropriately synchronized making communication between devices connected in the network possible.

A new device may be synchronized to the master of the network according to an acquisition scheme wherein the new device activates its receiver at a rate different from the frame rate of the network so that after some time the receiver of the new device is activated during transmission of synchronisation data from the master of the network. Upon reception of synchronisation data from the master, the frame timing of the new device is synchronized to coincide with the frame timing of the network whereby the receiver activation rate of the new device is adjusted in accordance with the frame rate.

This acquisition scheme has low power consumption during execution and it is fast.

Devices without power supply limitations may synchronize to the network simply by keeping the receiver activated until synchronisation data from the network master is received so that synchronisation data reception is obtained within the duration of a single frame. Such devices, e.g. remote controllers, fitting instruments, mobile phones, media players, headsets, door bells, alarm systems, broadcast systems, etc, need not change their frame rate during acquisition.

The network protocol may accept two or more master devices in the network. For example, two hearing instruments may operate as a master of the network in an alternating way whereby one hearing instrument operates as the master in certain time slots, and the other hearing instrument operates as the master in other time slots, and the first hearing instrument operates as the master again in the same time slots in the next frame, and so on.

Preferably, in a binaural hearing instrument, the left ear hearing instrument and the right ear hearing instrument are both masters in the network. In a dual master network, the two masters are relieved from the task of negotiating which of the two devices is to become the master of the network. In this way, savings in programming code and power consumptions are obtained in the two master devices.

In a network utilising frequency hopping, the frequency hopping algorithm of the devices must also be synchronised. A new device may be synchronized to the master of the network according to an acquisition scheme wherein the new device performs frequency hopping at a frequency hopping rate different from the frequency hopping rate of the network so that after some time the frequency channel utilized for reception by the new device coincides with the frequency channel utilized for transmission by the network master. For example, the master device may repeat the frequency channel jump sequence of four channels: A-B-C-D, while the new device, e.g. the other master device of a dual master network, during acquisition, reuses one of the frequency channels, e.g. channel A: A-A-B-C-D whereby, after some time, the master device and the new device will communicate on the same frequency channel.

Upon synchronisation, the frequency hopping algorithm generates a longer sequence of more frequency channels than during acquisition.

With finite accuracy of the clock signals used to control timing, various devices connected to the wireless network cannot synchronize the time slots with complete accuracy, e.g. a receiving participant in the network may not agree with a transmitting participant on when to start reception. This means that some margin is needed, which again means that hearing instrument network circuitry is required to be powered on during a larger time period than the respective time slot.

A more accurate timing would lower power consumption, however conventionally; this solution requires incorporation of bulky components (crystals).

However, the communication controller may further be adapted to determine the delay from receiver activation until actual data reception, i.e. the start of the received data frame may be detected, and the delay may be recorded. At the next occurrence of the time slot, start of reception may be adjusted, i.e. advanced or delayed, in accordance with the value determined during reception in the previous time slot whereby power consumption is lowered due to lowered activation time of the receiver.

In accordance with some embodiments, a hearing system includes a first hearing instrument having a first receiver for wireless data communication with a device in a wireless network, and a first communication controller that is configured for controlling the wireless data communication in accordance with a protocol of the wireless network according to which, a transmitter of the device is controlled to transmit wireless data in a specific time slot in a frame of time slots, and the first receiver of the first hearing instrument is repeatedly enabled to receive data for an activated time period and disabled from receiving data for a de-activated time period, wherein the first communication controller is further configured for synchronising the first hearing instrument to the device in the wireless network by adjusting a sum of the activated time period and the de-activated time period to be different from a duration of the frame so that the specific time slot for the transmission of data by the transmitter and the activated time period will overlap at one time.

In accordance with other embodiments, a method of communication between devices in a wireless network includes wirelessly transmitting data from a first device in the wireless network in a selected time slot in a frame of time slots, enabling data reception for an activated time period and disabling data reception for a de-activated time period in a second device, and synchronising the second device to the first device in the wireless network by adjusting the sum of the activated time period and the de-activated time period to be different from a duration of the frame so that the selected time slot for the transmission of data and the activated time period will overlap at one time.

DESCRIPTION OF THE DRAWING FIGURES

The above and other features and advantages will become more apparent to those of ordinary skill in the art by describing in detail exemplary embodiments thereof with reference to the attached drawings in which.

DETAIL DESCRIPTION

Some of the embodiments will now be described more fully hereinafter with reference to the accompanying drawings. The claimed invention may, however, be embodied in different forms and should not be construed as limited to the embodiments set forth herein. Thus, the illustrated embodiments are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated. Like reference numerals refer to like elements throughout.

The hearing instrument wireless network facilitates interconnection of a plurality of devices in the network, such as hearing instruments including hearing aids, remote controllers, fitting instruments, mobile phones, media players, headsets, door bells, alarm systems, broadcast systems, such as tele coil replacement, etc, etc.

In the illustrated example, the receiver and communication controller operate according to a frequency diversification or spread spectrum scheme, i.e. the frequency range utilized by the network is divided into a number of frequency channels, and transmissions switch channels according to a predetermined scheme so that transmissions are distributed over the frequency range. A frequency hopping algorithm is provided that allows devices in the network to calculate what frequency channel the network will use at any given point in time without relying on the history of the network, e.g. based on the present frequency channel number, a pseudo-random number generator calculates the next frequency channel number. This facilitates synchronization of a new device in the network, e.g. the new device comprises the same pseudo-random number generator as the devices already connected in the network. Thus, upon receipt of the current frequency channel number during acquisition, the new device will calculate the same next frequency channel number as the other devices in the network. Preferably, one device in the network operates a master device of the network. Other devices in the system synchronize to the timing of the master device, and preferably, the master device is a hearing instrument, since the hearing instrument user will always carry the hearing instrument when he or she uses the network.

It is an advantage of a network operating according to a spread spectrum scheme that the communication has a low sensitivity to noise, since noise is typically present in specific frequency channels, and communication will only be performed in a specific frequency channel for a short time period after which communication is switched to another frequency channel.

Further, several networks may co-exist in close proximity, for example two or more hearing instrument users may be present in the same room without network interference, since the probability of two networks simultaneously using a specific frequency channel will be very low. Likewise, the hearing instrument network may coexist with other wireless networks utilizing the same frequency band, such as Bluetooth networks or other wireless local area networks. Hearing instruments according to some embodiments may advantageously be incorporated into a binaural hearing system, wherein two hearing instruments are interconnected through the wireless network for digital exchange of data, such as audio signals, signal processing parameters, control data, such as identification of signal processing programs, etc, etc, and optionally interconnected with other devices, such as a remote control, etc.

Every device in the network has its own identification number, e.g. a 32-bit number. Globally unique identities are not required since the probability of two users having hearing instruments with identical identifications is negligible.

Preferably, a new device is automatically recognized by the network and interconnected with the network.

Figure 1:
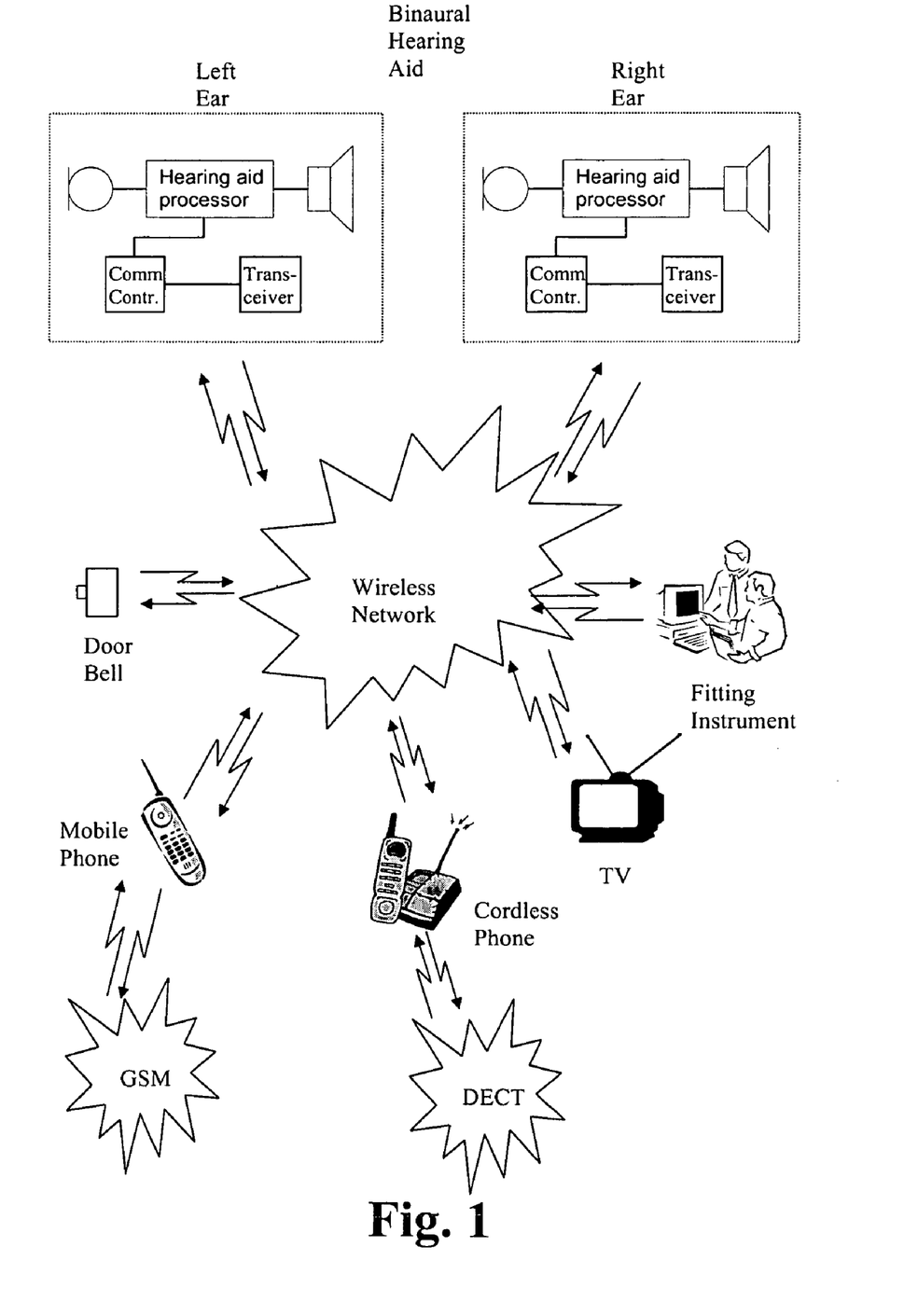
FIG. 1 schematically illustrates a hearing system wireless network.

FIG. 1 schematically illustrates a hearing system comprising a binaural hearing aid with a left ear hearing aid and a right ear hearing aid, each of which has a transceiver and communication controller for connection with a wireless network interconnecting the two hearing aids, and interconnecting the hearing aids and a plurality of other devices in the wireless network. In the example illustrated in FIG. 1, a doorbell, a mobile phone, a cordless phone, a TV-set, and a fitting instrument are also connected to the wireless network.

The illustrated embodiment operates in the 2.4 GHz industrial scientific medical (ISM) band. It comprises 80 frequency channels of 1 MHz bandwidth. A frequency hopping TDM scheme is utilized. During acquisition, the frequency hopping scheme comprises a reduced number of frequency channels, e.g. less than 16 channels, preferably 8 channels, for faster acquisition. Members of the reduced set of frequency channels are denoted acquisition channels. Preferably, the acquisition channels are distributed uniformly throughout the frequency band utilised by the network.

Figure 2:
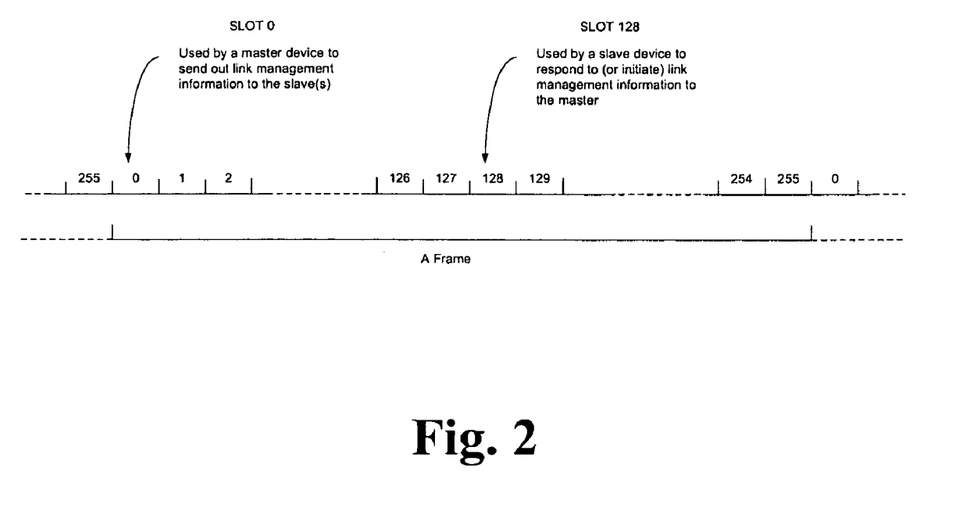
FIG. 2 illustrates slots and frames.

According to the protocol and as shown in FIG. 2, the time is divided into so-called slots that have a length of 1250 µs (twice the length of a minimum Bluetooth™ slot). The slots are numbered from 0 to 255.

256 slots, i.e. slot 0 to slot 255, constitute a frame. Frames are also numbered.

Among factors influencing selection of the length of a slot, is the required lower latency of the system and a desired low overhead with respects to headers and PLL locking.

Preferably, the slot length is a multiple of 625 µS, facilitating (i.e. not prevent) that the protocol according to some embodiments can be implemented on BLUETOOTH™ enabled devices.

Each slot (except slot 128) is used for transmission by one specific device so that data collisions inside the network are prevented. Any slave device may transmit data in slot 128 and hence collisions may occur in this slot. The master device transmits timing information in slot 0. The slot and frame counters of a slave device are synchronized with the respective counters of the master device of the network.

A device may use one or more slots for transmission of data. Slots may be allocated during manufacture of a given device, or, slots may be allocated dynamically during acquisition. Preferably, the allocation table is stored in the master device.

According to the time-division-multiple-access (TDMA) frame structure, the devices in a network transmit and receive data according to a coordinated time schedule wherein the time is divided into numbered time slots and different devices in the network communicate, e.g. receive data, in specific respective time slots. In order to lower power consumption in the hearing aid, the hearing aid transceiver is turned on only in its time slot. Further, the bit rate can be made scalable in such a system: When low bit transfer rates are required, the transceiver need only be active a small fraction of the time. In this way power can be saved.

In order for a device to be operationally connected to the network, its timing must be synchronized to the other devices in the network so that turn-on and turn-off timing of receivers and transmitters of the devices are appropriately synchronized making communication between devices connected in the network possible.

A new device may be synchronized to the master of the network according to an acquisition scheme wherein the new device turns its receiver on at a rate different from the frame rate of the network so that after some time the receiver of the new device is turned on during transmission of synchronisation data from the master of the network. Upon reception of synchronisation data from the master, the frame timing of the new device is synchronized to coincide with the frame timing of the network whereby the receiver turn-on rate of the new device is adjusted in accordance with the frame rate.

Figure 3:
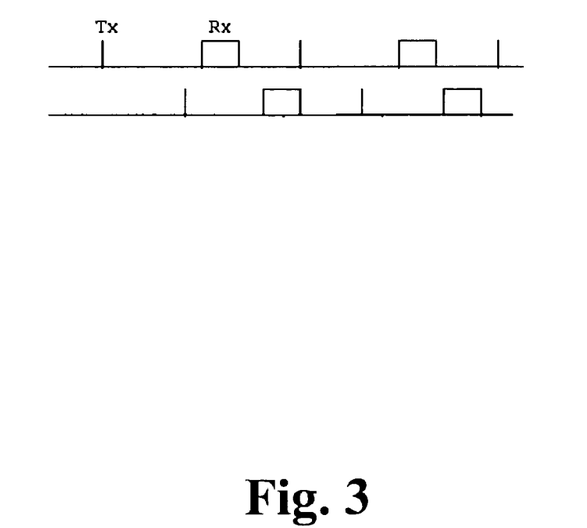
FIG. 3 illustrates slot timing during synchronisation.

This is further illustrated in FIG. 3 wherein the upper trace illustrates transmission Tx and reception Rx of the master of the network, and the lower trace illustrates transmission and reception of the new device. Tf is the frame rate of the master device defining the frame rate of the network. To is the duration of the receiver turn-on. In the illustrated example, the duration of transmission of the synchronisation data is less than To/2 so that the new device may operate with a frame rate of Tf–To/2 so that sufficient overlap of receiver turn-on with synchronisation data transmission for reception of the synchronisation data will be obtained within a reasonable time. A worst case synchronisation scenario is illustrated in FIG. 3 wherein the receiver of the new device (lower trace) is turned-off immediately before transmission of synchronisation data from the master. In this case, the time distance between the transmission and receiver turn-on is equal to the duration of one frame Tf minus To. Since the receiver turn-on time window moves towards synchronisation data transmission Tx by the amount To/2 for each new frame, the number of frames to be transmitted until synchronisation is obtained is $$F = \frac{Tf - To}{\frac{To}{2}},$$

and thus, the corresponding time for synchronisation is $$Tsync = \frac{Tf - To}{\frac{To}{2}} Tf.$$

For example, in a network with a frame time Tf of 16 milliseconds and a receiver turn-on time To of 1 millisecond, Tsync=480 milliseconds.

Devices without power supply limitations may synchronize to the network simply by keeping the receiver turned-on until synchronisation data from the network master is received so that synchronisation data reception is obtained within the duration of a single frame Tf. Such devices, e.g. remote controllers, fitting instruments, mobile phones, media players, headsets, door bells, alarm systems, broadcast systems, etc, need not change their frame rate during acquisition.

Figure 4:
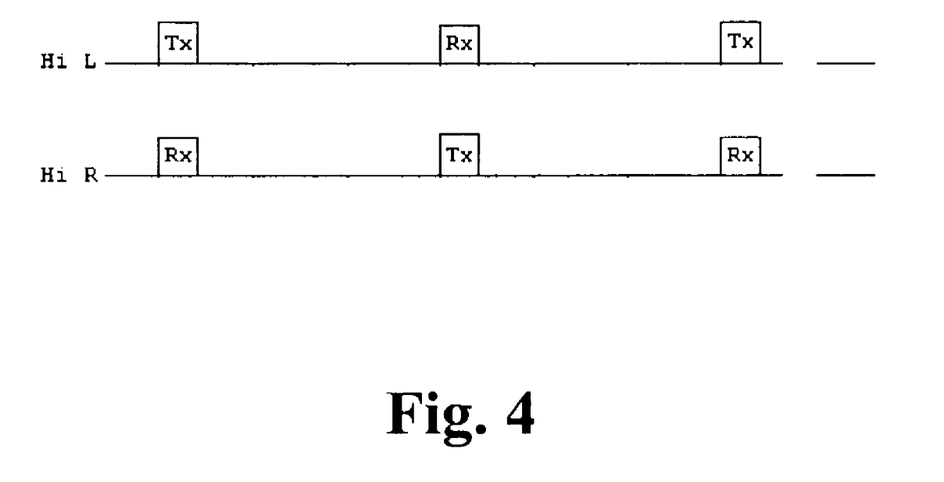
FIG. 4 illustrates dual master slot timing of two hearing instruments.
Figure 5:
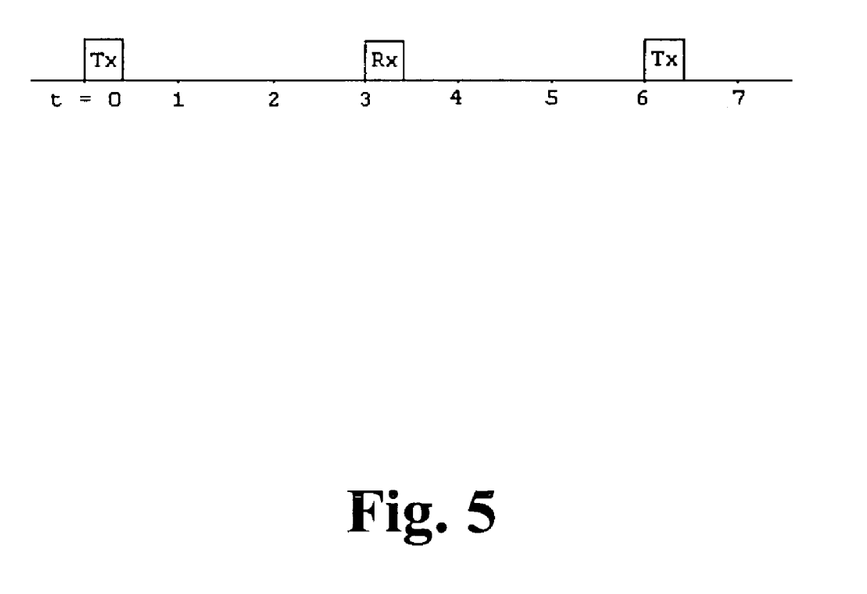
FIG. 5 illustrates dual master slot timing of one hearing instrument in more detail.

The network protocol may accept two master devices in the network. This is illustrated in FIG. 4 showing transmissions Tx and reception Rx of synchronisation data of two hearing instruments, both of which operate as a master of the network in an alternating way whereby one hearing instrument operates as the master in one frame, and the other hearing instrument operates as the master in the next frame, and the first hearing instrument operates as the master again in the next frame, and so on. This is further illustrated in FIG. 5 wherein the time from t=0 to t=6 whereafter the sequence is repeated, is named a super frame. The time from t=0 to t=3 is named a frame or a master frame. It is within its master frame, one master device has the right to transmit or request data while the other master device has the same right in the second half of the super frame, i.e. from t=3 to t=6. Thus, the frames and time slots of the example illustrated in FIG. 5 are denoted:
t=0 to t=6: Super frame
t=0 to t=3: Frame (master frame of first master)
t=3 to t=6: Frame (slave frame of first master)
t=x to t=x+1: Slot (data slot for x≠0 and x≠3)
t=0 to t=1: Synchronization slot of first master
t=3 to t=4: Synchronization slot of second master.

Preferably, in a binaural hearing instrument, the left ear hearing instrument and the right ear hearing instrument are both masters in the network. In a dual master network, the two masters are relieved from the task of negotiating which of the two devices is to become the master of the network. In this way, savings in programming code and power consumptions are obtained in the two master devices.

In a network utilising frequency hopping, the frequency hopping algorithm of the devices must also be synchronised. A new device may be synchronized to the master of the network according to an acquisition scheme wherein the new device performs frequency hopping at a frequency hopping rate different from the frequency hopping rate of the network so that after some time the frequency channel utilized for reception by the new device coincides with the frequency channel utilized for transmission by the network master. For example, the master device may repeat the frequency channel jump sequence of four channels: A-B-C-D, while the new device, e.g. the other master device of a dual master network, during acquisition, reuses one of the frequency channels, e.g. channel A: A-A-B-C-D. Below, 3 examples are illustrated of synchronisation, i.e. acquisition, of two hearing instruments in worst case scenarios, wherein one hearing instrument has finished transmission in frequency channel A when the other hearing instrument starts using frequency channel A:
N=4:
1) A A B C D A A B C D A A
2) B C D A B C D A B C D A
N=5:
3) A A B C D E A A B C D E A A B C D E A A
4) B C D E A B C D E A B C D E A B C D E A
N=6:
5) A A B C D E F A A B C D E F A A B C D E F A A B C D E F A A
6) B C D E F A B C D E F A B C D E F A B C D E F A B C It should be noted that the number of periods P until synchronisation in the examples given above is:

$P=(N-2)N+N-1,$ where N is the number of frequency channels in the jump sequence.

Thus,
P(N=4)=11
P(N=5)=19
P(N=6)=29
P(N=7)=41.

Upon synchronisation, the frequency hopping algorithm generates a longer sequence of more frequency channels than during acquisition.

Figure 6:
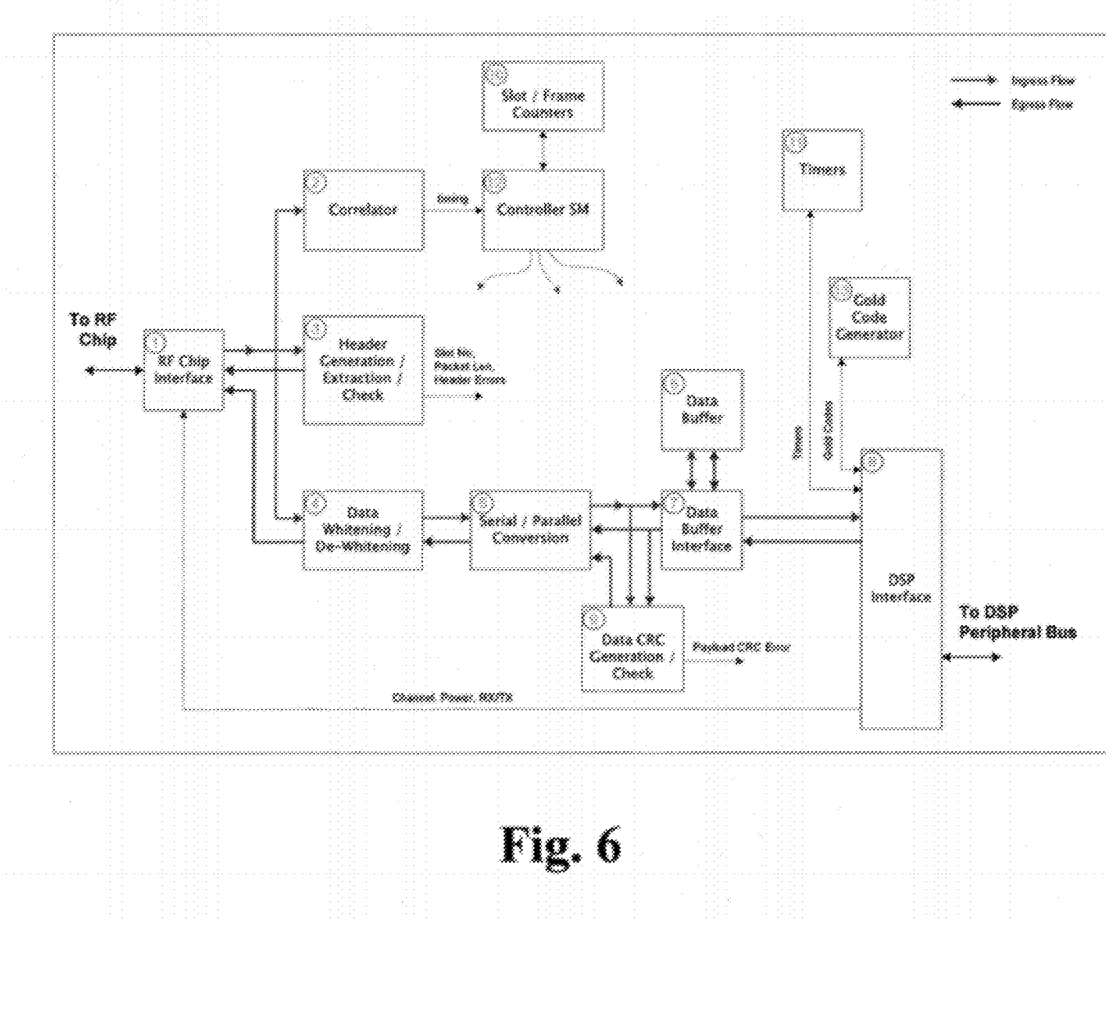
FIG. 6 is a blocked schematic of a transceiver and communication controller according to some embodiments.

FIG. 6 is a blocked schematic of a transceiver and communication controller according to some embodiments. FIG. 6 also illustrates the major data flow into and out of the units. At data reception, the RF chip interface 1 sends SPI commands to the RF chip for configuration. The RF chip interface receives a data stream from the RF chip.

The correlator 2 extracts the slot and frame timing from the sync word, so that the rest of the receive chain can be synchronized. Based on this timing, the header extraction block 3 analyses the package header and extracts the slot number and package length. Any errors in the header are reported. The data de-whitening block 4 de-whitens the package data. The data is then converted to 16 bits parallel by the serial-parallel conversion block 5. The package data is stored in an internal data buffer 6 by the data buffer interface 7. The data is then accessible to the DSP via the DSP interface 8 through the peripheral bus. A CRC check can also be performed on the package data 9. All internal configuration registers and results of header checks, CRC errors etc are accessible though the DSP interface. Slot and frame counters 10 are also provided as well as a number of hardware timers 11.

The controller state machine 12 is responsible for overall timing of the base-band engine.

A gold code generator 13 provides hardware assistance to the software in order to generate gold codes used to program the sync words.

At transmission, the RF chip interface 1 sends SPI commands to the RF chip for configuration.

The DSP writes a package of data to the data buffer 6, 7 via the DSP interface 8. The package data has a CRC calculated via the data CRC generation block 9. The combined data payload and CRC are then converted to serial 5 and whitened 4. The package header is constructed by the header generation block 3 and then appended to the data. The completed package is then streamed to the RF chip by the RF chip interface 1.

Although particular embodiments have been shown and described, it will be understood that they are not intended to limit the present inventions, and it will be obvious to those skilled in the art that various changes and modifications may be made without departing from the spirit and scope of the present inventions. The specification and drawings are, accordingly, to be regarded in an illustrative rather than restrictive sense. The claimed inventions are intended to cover alternatives, modifications, and equivalents.

The invention claimed is:

1. A hearing system comprising:
a first hearing instrument having
a first receiver for wireless data communication with a device in a wireless network, and
a first communication controller that is configured for controlling the wireless data communication in accordance with a protocol of the wireless network according to which,
a transmitter of the device is controlled to transmit wireless data in a specific time slot in a frame of time slots, and
the first receiver of the first hearing instrument is repeatedly enabled to receive data for an activated time period and disabled from receiving data for a de-activated time period;
wherein the first communication controller is further configured for synchronising the first hearing instrument to the device in the wireless network by adjusting a sum of the activated time period and the de-activated time period to be different from a duration of the frame so that the specific time slot for the transmission of data by the transmitter and the activated time period will overlap at one time.

2. The hearing system according to claim 1, wherein the first communication controller is further configured for adjusting the sum of the activated period and the de-activated time period to be equal to the duration of the frame upon reception of data by the first hearing instrument from the device.

3. The hearing system according to claim 1, wherein the first communication controller is configured for synchronising the first hearing instrument to the device in the network by adjusting the sum of the activated time period and the de-activated time period to be longer than the duration of the frame so that the time slot for transmission of data and the activated time period will overlap at the one time.

4. The hearing system according to claim 1, wherein the first hearing instrument further has a transmitter for wireless data communication, the transmitter of the first hearing instrument being a first transmitter, and the transmitter of the device being a second transmitter, and wherein the device is a second hearing instrument comprising
a second receiver and the second transmitter for wireless data communication between the first and second hearing instrument in the wireless network, and
a second communication controller that is configured for controlling the wireless data communication in accordance with the protocol of the wireless network, and
wherein, upon synchronization of the first hearing instrument with the second hearing instrument in the network, the first communication controller and the second communication controller are configured for alternating transmission of synchronisation data in the network, thereby forming a dual master network.

5. The hearing system according to claim 1, wherein at least one of the first communication controller and the second communication controller is configured for controlling the respective one of the first transmitter and the second transmitter to transmit synchronisation data repetitively at a first rate, and upon receipt of a message indicating a synchronisation of the first hearing instrument and the device, to transmit synchronisation data repetitively at a second rate that is lower than the first rate.

6. The hearing system according to claim 4, wherein the first communication controller is configured for controlling the first receiver and the first transmitter for selective operation in a plurality of frequency channels, and the second communication controller is configured for controlling the second receiver and the second transmitter for selective operation in the plurality of frequency channels.

7. The hearing system according to claim 4, wherein the first communication controller is configured to operate the first receiver and the first transmitter according to a frequency hopping scheme, and the second communication controller is configured to operate the second receiver and second transmitter according to the frequency hopping scheme.

8. The hearing system according to claim 7, wherein the frequency hopping scheme allows the hearing instruments in the network to calculate what frequency channel the network will use at any given point in time without relying on a history of the network.

9. The hearing system according to claim 6, wherein before the synchronisation of the first hearing instrument with the second hearing instrument in the network,
the first communication controller is configured for performing frequency hopping at a first frequency hopping rate, and
the second communication controller is configured for performing frequency hopping at a second frequency hopping rate different from the first frequency hopping rate so that the first and second hearing instruments will perform data communication on a same one of the plurality of frequency channels.

10. The hearing system according to claim 9, wherein the first and second communication controller are configured for performing synchronous frequency hopping after the synchronisation of the first hearing instrument with the second hearing instrument in the network.

11. The hearing system according to claim 1, wherein at least one of the first communication controller and the second communication controller is configured for
- determining a delay between a receiver activation and an actual start of reception of data, and
- adjusting a next receiver activation in accordance with the determined delay.

12. A method of communication between devices in a wireless network, comprising:
- wirelessly transmitting data from a first device in the wireless network in a selected time slot in a frame of time slots;
- enabling data reception for an activated time period and disabling data reception for a de-activated time period in a second device; and
- synchronising the second device to the first device in the wireless network by adjusting the sum of the activated time period and the de-activated time period to be different from a duration of the frame so that the selected time slot for the transmission of data and the activated time period will overlap at one time.

13. The method according to claim 12, further comprising adjusting the sum of the activated period and the de-activated time period to be equal to the duration of the frame upon reception of data from the first device.

14. The method according to claim 12, wherein the sum of the activated time period and the de-activated time period is adjusted to be longer than the duration of the frame.

15. The method according to claim 12, further comprising alternating transmission of synchronisation data from the first and the second devices in the network to thereby form a dual master network.

16. The method according to claim 12, further comprising transmitting synchronisation data repetitively at a first rate before synchronisation of the second device with the first device, and transmitting synchronisation data at a second rate that is lower than the first rate upon synchronisation of the second device with the first device.

17. The method according to claim 12, wherein the act of transmitting the data is performed sequentially in a plurality of frequency channels.

18. The method according to claim 17, wherein the act of transmitting the data is performed according to a frequency hopping scheme.

19. The method according to claim 18, further comprising calculating a next frequency channel to be used in the wireless network independent of a previous sequence of frequency channels used.

20. The method according to claim 17, further comprising, before synchronisation of the second device with the first device in the network, performing frequency hopping at a first frequency hopping rate in the first device, and performing frequency hopping at a second frequency hopping rate in the second device;
- wherein the second frequency hopping rate is and different from the first frequency hopping rate.

21. The method according to claim 20, further comprising performing synchronous frequency hopping in the first and second devices after synchronisation of the devices.

22. The method according to claim 12, further comprising:
- determining a delay between a receiver activation and an actual start of reception of data; and
- adjusting a next receiver activation in accordance with the determined delay.

* * * * *